1,439,487

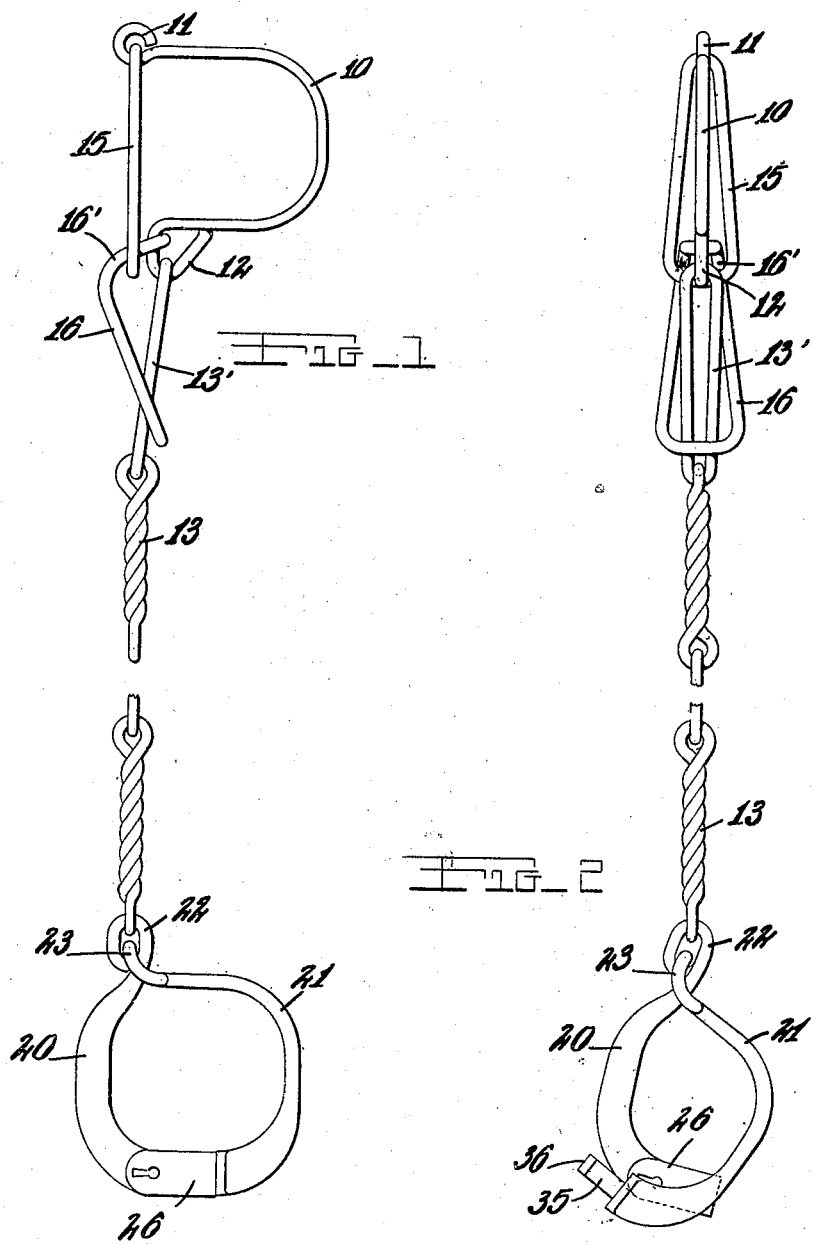

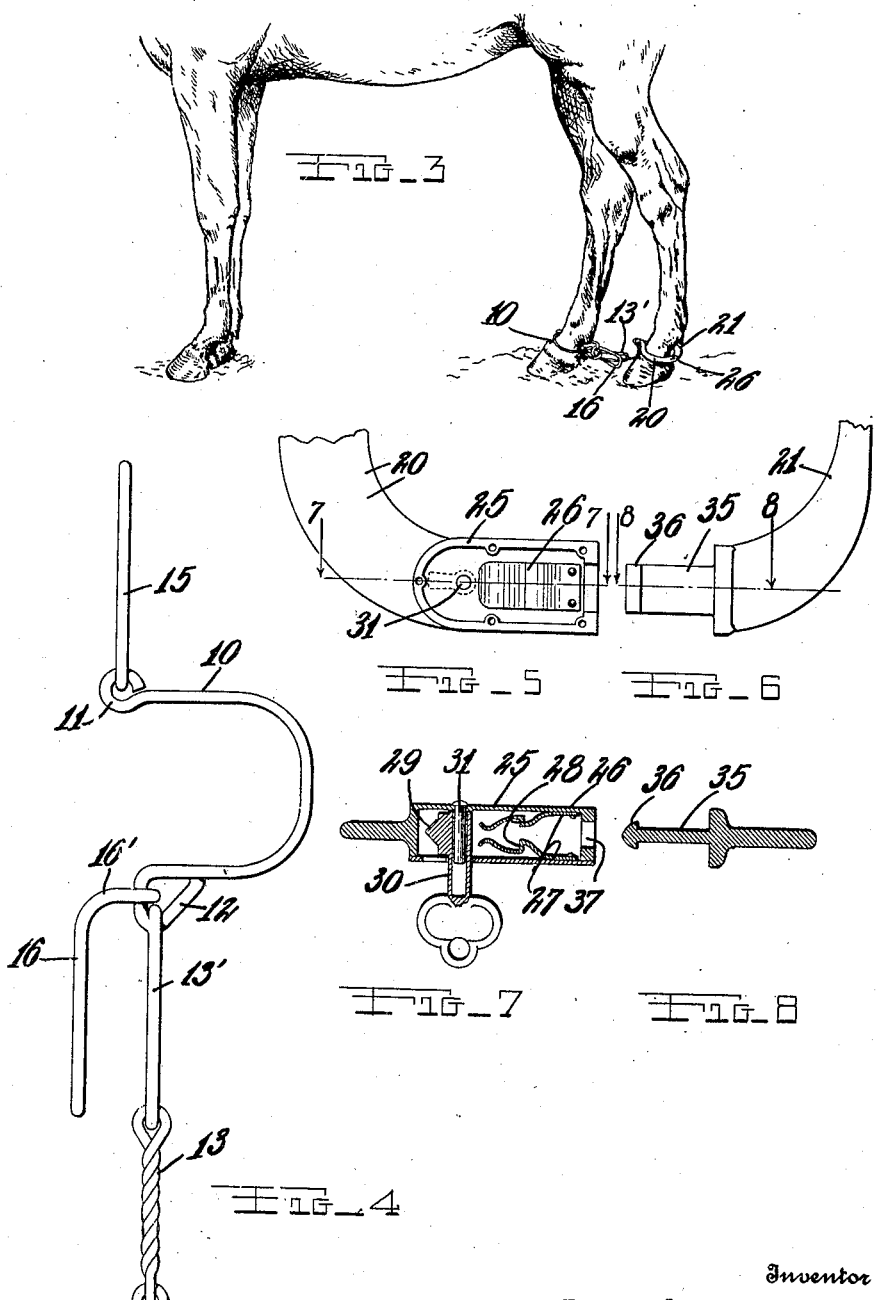
Dec. 19, 1922.
L. SCHWEIKOWSKI,
ANIMAL HOPPLE.
ORIGINAL FILED DEC. 29, 1921.
1,439,487
2 SHEETS-SHEET 2
Inventor
Leo Schweikowski Patented Dec. 19, 1922.

UNITED STATES PATENT OFFICE.

LEO SCHWEIKOWSKI, OF GARRETT, PENNSYLVANIA.

ANIMAL HOPPLE.

Application filed December 29, 1921, Serial No. 525,673. Renewed November 17, 1922. Serial No. 525,673.

*To all whom it may concern:*

Be it known that I, LEO SCHWEIKOWSKI, citizen of the United States, residing at Garrett, in the county of Somerset and State of Pennsylvania, have invented certain new and useful Improvements in Animal Hopples, of which the following is a specification.

This invention relates to hopples for animals, which are used to keep the animals from straying, or running away.

The invention has for an object to provide a cheap and efficient type of hopple which can be readily applied to, or removed from, the legs of the animal.

For further comprehension of the invention, and of the objects and advantages thereof, reference will be had to the following description and accompanying drawings, and to the appended claims in which the various novel features of the invention are more particularly set forth.

Fig. 1 of the drawings is a plan view of a hopple constructed according to the invention, showing the leg engaging parts in closed position.

Fig. 2 is a side view thereof.

Fig. 3 is a side view of the lower portion of a horse, showing the hopple applied to the hind legs thereof.

Fig. 4 is a fragmentary plan view showing one of the leg engaging elements in open position.

Fig. 5 is a detail plan view, with the face plate removed, of the socket member forming part of the locking means for the other leg engaging element, showing also a portion of the shackle arm on which said socket member is carried.

Fig. 6 is a plan view of the co-operating end of the other shackle arm.

Figs. 7 and 8 are detail longitudinal sectional view of the parts shown in Figs. 5 and 6, these views being taken along the line 7—8 extending through the said figures.

In constructing my improved hopple I provide a U-shaped rod 10 which is adapted to be slipped over one leg of the animal and is bent at its ends into eyes 11 and 12, the end containing the eye 11 being extended longitudinally beyond the other end as shown. The eye 12 has attached thereto one end of a chain 13 whose other end is attached by a shackle to the adjacent leg of the animal.

To secure the U-shaped rod 10 to the leg of the animal a shackle-bar 15 consisting of a loop member bent to present slightly diverging reaches is connected at one end to the eye 11. This bar 15 is adapted to be swung across the leg of the animal and to be secured to or adjacent the other end of rod 10. To this end a locking lever 16 is connected to the eye 12 and presents a short portion 16′ which extends through the larger end of the shackle-bar 15, and a main portion at right angles to the part 16′ and under which the end of the bar 15 is looped, this lever also comprising a flattened loop.

To hold this lever 16 in proper position, the chain 13 (with the shackle which engages the other leg) is inserted through the looped lever 16 and holds the latter in the position shown in Fig. 1 of the drawings. The end link 13′ of the chain 13 is of such a length that when the parts are in the extended position shown in Fig. 1 of the drawings it projects across the end of the lever 16, the eye 12 being elongated slightly so that the link 13′ can be retracted to clear the end of the lever 16 when the parts 13′ and 16 are swung to a position at right angles to that shown.

The opposite end of chain 13 has attached thereto a shackle device adapted to engage the other leg of the animal which comprises a pair of suitably curved shackle arms, 20 and 21, one of which is here shown as having an eye 22 formed on one end which engages the chain, and is in turn engaged by an eye 23 on the end of the other.

The free end of the shackle arm 20 has formed thereon a socket casing 25, one side of which is in the form of a removable plate 26 and which has fixed to opposite sides thereof a pair of flat springs 27 in complementary opposed relation to each other and bent inwardly toward one another between their ends to present a pair of alined shoulders 28, the springs being carried inwardly toward one another at their free ends, these ends being adapted for engagement by the bit 29 of a key 30 to force the shoulders 28 apart, a pin 31 in the casing 25 localizing the key, which is inserted in an ordinary key-hole in the plate 26.

The other shackle-arm 21 has formed therein a projecting bolt 35 having a triangular head 36 which is inserted through a suitable opening 37 in the casing 25 until the head 36 is engaged by the shoulders 28 of the springs 27.

In applying my improved hopple to the legs of the animal the rod 10 is first inserted over one leg. The locking lever 16 is then passed through the shackle-bar 15, and the chain 13 (with its shackle members 20, 21) passed in turn through the locking lever and swung to the position shown in Fig. 1 of the drawings. The arms 20, 21 are then passed around the other leg of the animal and the bolt 35 snapped into place in the member 25.

Having thus described my invention what I claim as new and desire to protect by Letters Patent of the United States is as follows:

1. In a hopple for animals, a U-shaped rod adapted to engage one leg of an animal, a shackle-bar hinged at one end to one end of said rod and adapted to extend across the leg of the animal into close adjacence to the other end of said rod, a locking lever hinged to the opposite end of the rod and adapted to pass through the said bar to hold the latter in operative position, and a chain attached to the last mentioned end of the rod and adapted to pass through the said lever, said chain having engaging means for the other leg of the animal upon its opposite end.

2. In a hopple for animals, a U-shaped rod adapted to engage one leg of an animal, a shackle-bar hinged at one end to one end of said rod and adapted to extend across the leg of the animal into close adjacence to the other end of said rod, a locking lever hinged to the opposite end of said rod and adapted to pass through the said bar to hold the latter in operative position, and a chain attached to the last end of said rod and adapted to pass through the said lever, the end link of said chain being of sufficient length to extend across the end of said lever when the parts are in operative position.

3. In a hopple for animals, a U-shaped rod adapted to engage one leg of an animal, a shackle-bar hinged at one end to one end of said rod and adapted to extend across the leg of the animal into close adjacence to the other end of said rod, a locking lever hinged to the opposite end of said rod and adapted to pass through the said bar to hold the latter in operative position, and a chain attached to the last end of said rod and adapted to pass through the said lever, the end link of said chain being of sufficient length to extend across the end of said lever when the parts are in operative position, the said rod having an elongated eye on its end to which said lever and chain are attached.

4. In a hopple for animals, a U-shaped rod adapted to engage one leg of an animal, a shackle-bar hinged at one end to one end of said rod and adapted to extend across the leg of the animal into close adjacence to the other end of said rod, a locking lever hinged to the opposite end of said rod and adapted to pass through the said bar to hold the latter in operative position, and a chain attached to the last end of said rod and adapted to pass through the said lever, the end link of said chain being of sufficient length to extend across the end of said lever when the parts are in operative position, the said rod having an elongated eye on its end to which said lever and chain are attached, said lever being of angular form with a short transversely extended end portion engaging said eye.

5. In a hopple for animals, a U-shaped rod adapted to engage one leg of an animal, a shackle, bar hinged at one end to one end of said rod and adapted to extend across the leg of the animal into close adjacence to the other end of said rod, a locking lever hinged to the opposite end of said rod and adapted to pass through the said bar to hold the latter in operative position, and a chain attached to the last end of said rod and adapted to pass through the said lever, the end link of said chain being of sufficient length to extend across the end of said lever when the parts are in operative position, the said rod having an elongated eye on its end to which said lever and chain are attached, said shackle-bar and locking lever being in the form of flattened loops.

In testimony whereof I have affixed my signature.

LEO SCHWEIKOWSKI.